June 16, 1942.   E. A. GODLEY   2,286,676
POSTING BOARD
Filed July 1, 1940   2 Sheets-Sheet 1
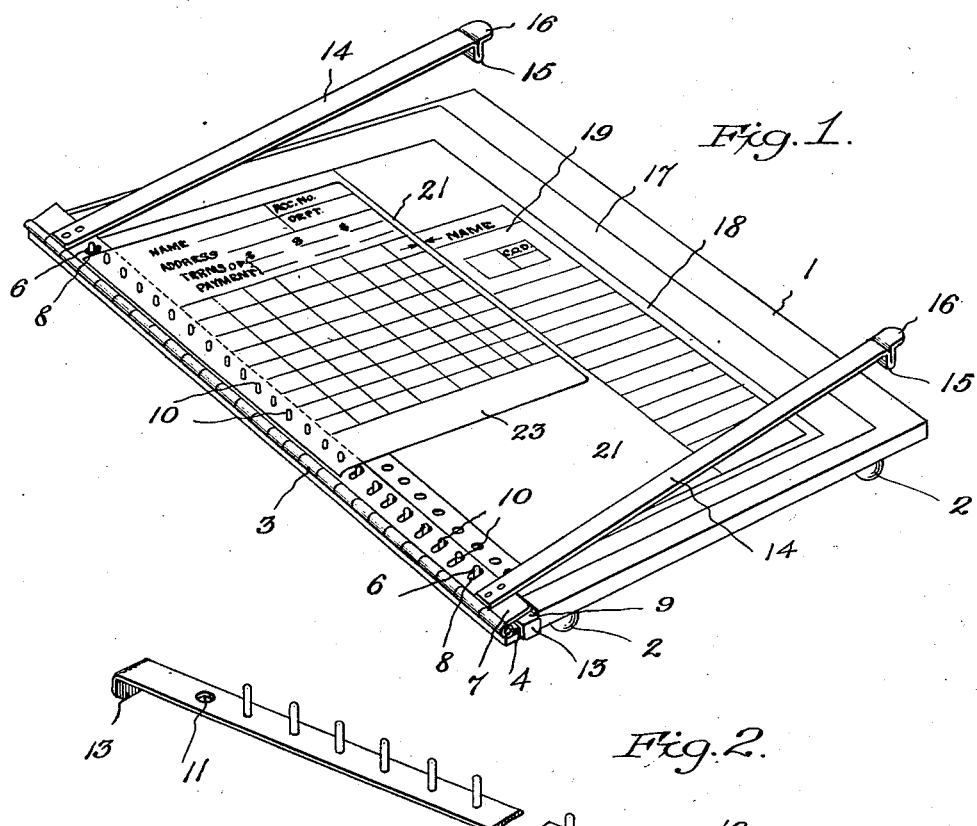
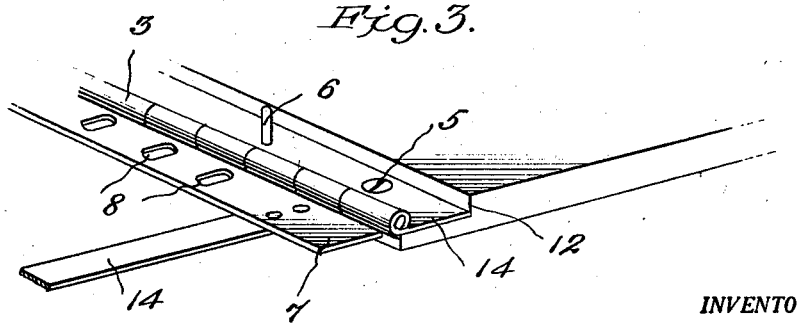
INVENTOR.
EDWIN A. GODLEY
BY
ATTORNEY June 16, 1942.    E. A. GODLEY    2,286,676
POSTING BOARD
Filed July 1, 1940    2 Sheets-Sheet 2

Fig. 4.

Fig. 5.
LEDGER CARD 23
SECOND CARBON 21
CUSTOMER'S RECEIPT 19
FIRST CARBON 18
PROOF SHEET 17

Fig. 6.
JOHN DOE DRY GOODS CO.
NEW YORK, N.Y.

Fig. 7.
UNIT ANALYSIS SLIP
CLERK'S STUB

INVENTOR.
EDWIN A. GODLEY
BY
ATTORNEY

Patented June 16, 1942

2,286,676

UNITED STATES PATENT OFFICE 2,286,676

POSTING BOARD

Edwin A. Godley, New York, N. Y., assignor to S. D. Leidesdorf & Co., New York, N. Y., a partnership Application July 1, 1940, Serial No. 343,369

3 Claims. (Cl. 282—29)

The present invention relates to posting devices, and more particularly, to a posting board for collating a plurality of forms for simultaneously making entries on the various forms in a single posting.

Heretofore, in various bookkeeping operations, especially in bookkeeping operations covering installment and lay-away accounts receivable in chain stores, various devices have been used. Thus, in the simplest case, a receipt or voucher was made and handed to the customer and the data contained therein have been transferred to a proof sheet and to a ledger card. Of course, this conventional procedure involved transcription operations requiring a great deal of time and frequently causing transcription errors. Other systems of bookkeeping involved the use of bookkeeping machines or tabulating machines which have been prohibitive in cost for smaller enterprises. Although also various other suggestions and proposals were made to provide a device and a method wherein a unit posting provides multiple records, as far as I am aware of, none of these prior procedures and devices was completely satisfactory and successful.

I have discovered that the problem may be solved in remarkably simple manner.

It is an object of the present invention to provide a posting device which eliminates the above disadvantages and inconveniences of conventional devices and procedures.

It is another object of the present invention to provide a novel and improved posting device for collating two or more forms whereby entries may be made on the various forms in a single posting.

It is a further object of the present invention to provide a peg type posting board adapted to receive and to hold three, or more, forms including a proof sheet, a customer's receipt and a ledger card, on which entries may be made in a single posting operation whereby great efficiency in operation is obtained and the possibility of transcription errors is completely eliminated.

It is also within the contemplation of the invention to provide a posting board in combination with forms of special character which automatically indicate the writing line into which the next entry has to be made.

The invention also contemplates a novel peg type posting board operatively associated with a plurality of forms of special character which is simple in construction, fool-proof in operation and which may be readily manufactured and sold on a practical and commercial scale at a low price.

Other and further objects and advantages of the invention will become apparent from the following description taken in conjunction with the accompanying drawings, in which:

Fig. 1 illustrates a perspective view of a preferred embodiment of the invention in its operative position;

Fig. 2 depicts a similar view of a peg strip employed in connection with the device of the invention;

Fig. 3 shows a fragmentary and enlarged perspective view of the perforated hinge forming part of the posting board embodying the invention;

Fig. 4 is a top elevational view on a larger scale of the posting board embodying the invention with a plurality of forms placed thereon in operative position;

Fig. 5 illustrates a vertical sectional view taken on line 5—5 of Fig. 4, the distance between the various sheets or forms being exaggerated for reasons of clarity;

Fig. 6 depicts a perspective view of one of the customer's receipts employed in connection with the device shown in the previous figures; and Fig. 7 shows a similar view of a modified form of customer's receipt.

Broadly stated, according to the principles of the invention, a peg type posting board is provided constituted of a board made of Bakelite wood, metal, or some other smooth and hard-surfaced material. The size of this board is governed by the type of record to be maintained and the space required for posting these records. A special type of perforated hinge is attached to one of the side edges of this posting board, the lower lid of said hinge being attached to the board while the upper lid thereof is provided with a row of openings to permit a row of pegs to protrude therethrough. Two pegs are attached to the lower lid of the hinge adapted to cooperate with a special and removable peg strip containing pegs spaced at equal distances from each other. The special peg strip is also provided with two holes adapted to cooperate with the pegs protruding from the lower lid of the hinge whereby the special peg strip may be readily inserted into the hinge and may be readily removed therefrom. Forms of various size and character having rows of holes provided in one side thereof may be inserted on these peg strips and may be locked in predetermined position by closing the upper lid of the hinge. Generally speaking, I prefer to use a proof sheet, a plurality of vouchers or customer's receipts mounted in shingle-like relation, and a ledger card in such relative position that an impression made on one of the writing lines of the ledger card may be simultaneously transferred to both the customer's receipt and to the proof sheet by means of transfer sheets provided between the proof sheet, the customer's receipt and the ledger card. I have found it desirable to provide some means to automatically indicate the writing line into which the next entry has to be made in order to make the entry in consecutive writing lines of the proof sheet. In addition, in various cases I prefer to employ a voucher or receipt strip of a composite character which may be separated in to two or more portions, or units. These units of the vouchers may be used for statistical and other purposes, as it will be explained more fully hereinafter.

Figures 4, 5, 6, 7:
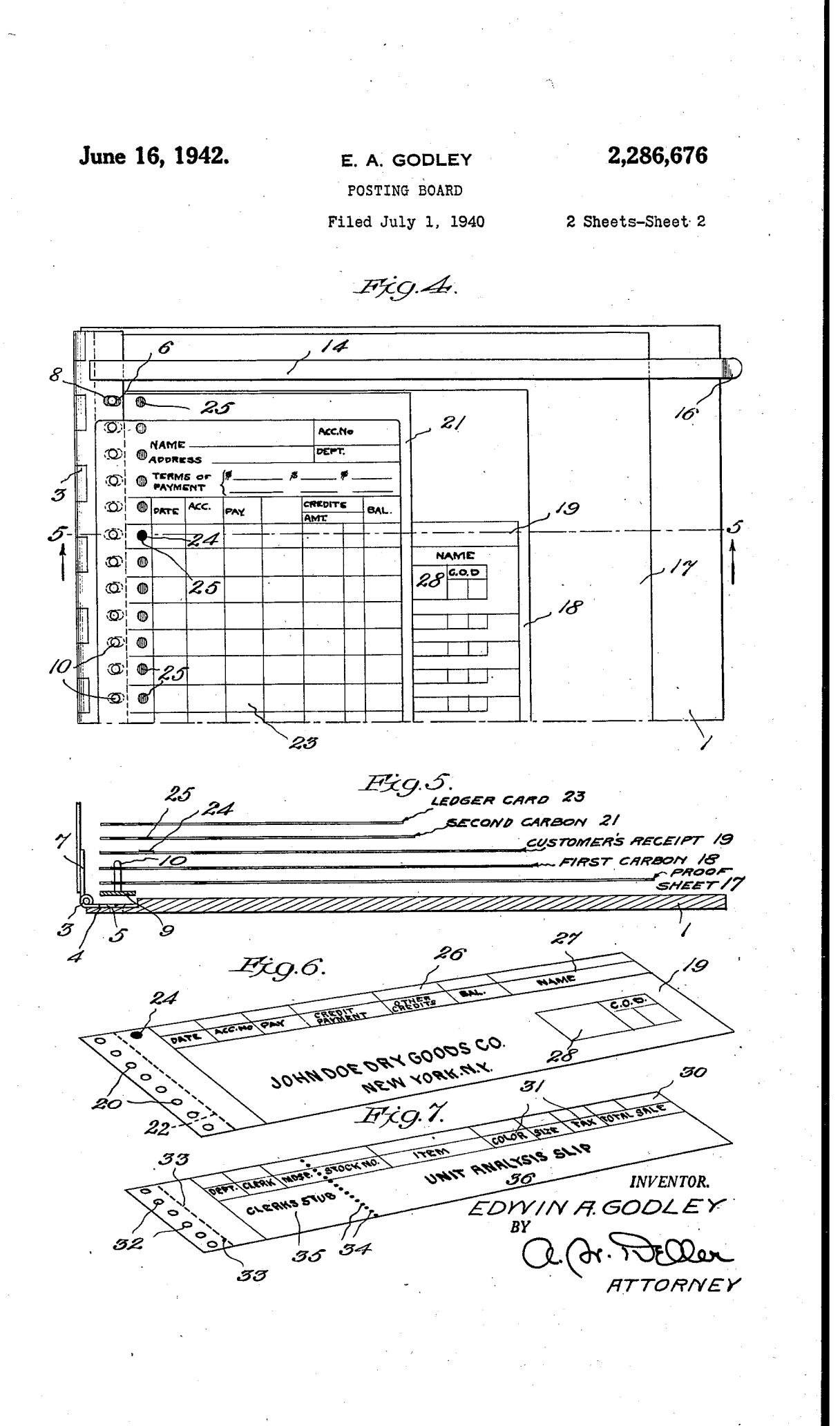

The invention will now be more fully explained to those skilled in the art in connection with the preferred embodiment thereof illustrated in the drawings. Referring now more particularly to Figs. 1 to 5 of the drawings, essentially a posting board 1 is provided resting on a plurality of feet 2. These feet may be of equal length or the two feet located underneath the upper portion of the board may be longer in order to assure an inclined direction of the board and thereby to facilitate making the various entries thereon. A special type of perforated hinge 3 is attached to the left edge of the posting board. The lower lid 4 of this hinge is attached to the posting board by means of screws 5. Two pegs 6 are attached to the lower lid of the hinge, one at the top of the hinge and the other at the bottom. The upper lid 7 of the hinge folds over the lower section and is provided with a row of elongated openings or holes 8 to permit the upper and lower pegs to protrude when the hinge is closed. A special peg strip 9 (Fig. 2) made of metal and containing pegs 10 spaced at equal distances from each other is provided having a hole 11 at the top and at the bottom thereof in the same relative position as pegs 6 on the lower lid of the hinge. Peg strip 9 serves as a holding device upon which the various forms such as a proof sheet, carbons, unit receipts, etc., may be mounted. Peg strip 9 fits into a groove 12 between the upper and lower sections of hinge 3 and is held in place by the two pegs 6 on the hinge, as well as by downward turned edges 13 on the peg strip itself which lock over the top and bottom edge of the posting board. The upper section of the hinge is perforated to permit pegs 10 on the peg strip to protrude when the hinge is closed. The spacing of the pegs in the peg strip and the holes in the upper lid of the hinge conform to each other. The distance between the individual pegs may be varied according to the spacing desired on the posted records.

While hinge 3 provides secure locking of the various forms at the left hand edge thereof, I found it to be desirable to provide additional elements to hold the forms against the surface of the posting board. These elements comprise strips of spring metal 14 joined to upper lid 7 of the hinge and running across the width of the posting board. These strips of metal are provided with a locking and lifting device at the extreme right edge thereof, at the point where they meet the right-hand edge of the posting board. This locking and lifting device is provided by turning the edge of the spring metal strips in order to provide indentations 15 at the point where they meet the edge of the board. A finger lift 16 is provided by straightening the edge of the strip after the indentation has been made. At the point where the indentation on the metal strip locks over the edge of the posting board, a small metal piece (not shown) may be inserted into the board and acts as a guide track and bumper. When both of these strips are locked in place, the forms that are mounted on the peg strip are solidly and positively locked into position. Pegs 10 on peg strip 9 extend above the locked upper lid of hinge 3 sufficiently to permit placement of a third collated form, or ledger card thereon.

The left-hand marginal portion of all forms to be used with the posting board of the invention are punched with holes that conform to the pegs on the peg strip. I prefer to use a primary or proof sheet 17 properly ruled and containing all of the columnar headings covering the figures to be entered on the record. A sheet of transfer paper or carbon paper 18 which also contains punched holes along its left binding edge, is placed on top of the proof sheet with the holes likewise locked over the pegs on peg strip 9. I prefer to make this carbon sheet of the same depth but of a width which is inferior to that of the proof sheet so that some of the right hand columns of the proof sheet remain uncovered. This narrower width of the carbon sheet has the object to permit visibility of the last posting previously made to the record and thus enable proper collation of the record card with the other records.

A series of unit receipt forms 19 containing punched holes 20 in the left edge, are next mounted on peg strip 9 in a shingle-like manner so that each receipt form extends one writing line above the preceding receipt form. A sufficient number of such receipt forms are mounted in shingle-like arrangement to provide for each available writing line on the proof sheet. For example, the pegs on the peg strip may be mounted one-half inch apart from each other, likewise the holes on the proof sheet and on the carbon paper are punched one-half inch apart. However, as it is desired to use a writing line every quarter of an inch, the holes on the individual receipt forms are punched one-quarter of an inch apart. To obtain a staggered arrangement of the receipt forms upon the peg strip, the first receipt is so placed that its bottom hole lies upon the lowest peg, the second receipt is placed so that its lowest hole lies in the space between the lowest peg and the next lowest peg, and the third receipt so that its bottom hole lies upon the second lowest peg, etc. In this arrangement of the receipts, there is one-quarter of an inch spacing between the top of each receipt. This one-quarter of an inch is the space upon which the written information will be entered. In this manner, there is a minimum of paper between the writing and carbon surfaces.

A second carbon sheet 21 also containing holes along its left edge is next placed over the mounted unit receipts. This carbon sheet has also the same depth as proof sheet 17 but is considerably narrower than the proof sheet or even the unit receipts. This reduction in the width of upper carbon sheet 21 permits easy access to the uppermost remaining receipt form 19 in order that it may be securely grasped between the thumb and forefinger of the right hand and "snapped out" at tearing line 22. After proof sheet 17, the first carbon 18, unit receipts 19 and second carbon 21 have been mounted upon peg strip 9, the peg strip is locked over the two pegs 10 in the lower section of hinge 3 and the hinge is closed, the metal locking strips 14 being clamped onto the right side of the board.

From the foregoing description the operation of the posting board of the invention will be readily understood by those skilled in the art. Individual customer's ledger cards 23 containing holes along the left edge, for example spaced one-quarter of an inch apart, are used. The next available writing line on ledger card 23 is manually collated with the next open receipt 19 on the posting board, and this ledger card is placed in correct position by dropping it over pegs 10 of peg strip 9 protruding through openings 8 of the closed hinge. The bookkeeping entry is then made in pencil, indelible pencil or ink pencil to the ledger card and these entries produce carbon copies upon the uppermost receipt 19 and upon the proof sheet 17. Ledger card 23 is then withdrawn and returned to its master file. Hereinafter, the customer's receipt 19 is "snapped out" and given to the customer and the board is now in position for the next posting operation. Due to the fact that each subsequent ledger card is collated with the next open receipt form, the entries upon the proof sheet appear in consecutive order, properly spaced, for example each one a quarter of an inch below the other.

When the last receipt of the sheet of receipts 19 in shingle-like arrangement has been used on one "set up," hinge 3 is unlocked, peg strip 9 is removed together with the various sheets thereon, and a new "set up" may be immediately mounted upon the posting board. In practical operation, extra peg strips are provided so that there may be no time lost between the posting of the last entry on one proof sheet and the first entry on another. A column is provided on the right hand section of the proof sheet for a pick-up of the old balance. Thus, at the end of each proof sheet it is possible to prove the accuracy of the individual entries by adding the amounts shown in the various columns and crossfooting the totals to see if they check out. If the totals of the proof sheet do not check out, a simple review of the individual line entries can then be made to ascertain where the error has occurred. Inasmuch as the account number is entered with each posting, it is a simple matter to refer to the filed ledger card in the event of an error and to make the necessary correction.

The dimensions of the proof sheet, customer's receipt, ledger card, and of the first and second carbon sheet depend on the type of record to be maintained and the space required for the posting of these records. For example, in a practical installation employed for installment and lay-away accounts in a chain store, I have employed a proof sheet about 12 inches wide and 17 inches deep mounted on a posting board which was 14 inches wide and 18 inches deep. This proof sheet was provided with a row of holes at the left edge thereof spaced half an inch apart. A sheet of carbon paper having punched holes along its left binding edge at the same distance was placed on top of the proof sheet and was 17 inches deep but only 8½ inches wide. A series of unit receipt forms in a staggered or shingle-like arrangement was placed on top of this first carbon, each receipt form being 8½" wide and 2½" deep. The holes in the left hand edge of the unit receipt forms were punched one-quarter of an inch apart corresponding to writing lines on each quarter of an inch of proof sheet. The second carbon sheet also having holes along its left edge was also 17" deep but only 6¼" wide. The reduction in the width of the second carbon sheet was possible because the ledger card upon which the original entries are made was only 6¼" wide. The individual customer's ledger cards were 6¼" wide and 8" deep and contained holes along the left edge thereof spaced one-quarter of an inch apart corresponding to a writing line one-quarter of an inch in width. Of course, these dimensions of the various forms to be used in connection with the device of the invention are merely illustrative as various other proportions and dimensions may be used in accordance with the bookkeeping or accounting problem contemplated.

Although the forms mounted on the posting board clearly indicate the next writing line of the proof sheet onto which the next entry has to be made, in order to avoid the possibility of error and to further facilitate proper collation of the individual ledger cards, I provide an auxiliary and direct indication of the next writing line wherein the entry has to be made. For this purpose I print a black dot 24 or some other mark on the writing line of the customer's receipt. In addition, I provide a second row of holes 25 both in the left hand edge of customer's ledger card 23 and in the left hand edge of second carbon sheet 21. This second row of perforations does not take any part in securing the various forms or carbons to the peg strip and the only object of their provision is to render the black indicating mark or dot 25 on the customer's receipt visible to the operator. As it will be readily observed particularly in Fig. 4, the black mark 24 of the uppermost and operative customer's receipt will be visible to the operator through holes 25 of second carbon 21 and customer's ledger card 23, directly and positively indicating the writing line of the amount or ledger card wherein the next entry has to be made. It will be readily appreciated, that this simple arrangement facilitates the proper insertion of the customer's ledger card and prevents making any entries to a wrong line.

The general appearance of the customer's receipt will be best observed in Fig. 6. The unit receipt 19 is provided with a single writing line 26 which is in the same line with indicating mark 24. This writing line is also provided with various headings 27 which facilitate interpretation of the data appearing in the writing line after the unit receipt has been detached. A further box 28 may be provided on the lower portion of the unit receipt for additional insertions. This unit receipt is provided with a row of perforations or holes 29 which are engaged by the peg strip and may be easily detached at tearing line 22 and handed to the customer.

In some cases it is advantageous to provide a unit receipt which is separable into a plurality of portions. A unit receipt or voucher of this separable type is depicted in Fig. 7. It will be noted that this modified form of voucher is closely similar to the one shown in Fig. 6 and has a writing line 30 cooperating with headings 31. A row of holes 32 is provided in the left hand marginal portion of this voucher for mounting it in predetermined position on a peg strip, and a tearing line 33 is provided to facilitate withdrawal of the complete strip. In addition, a second tearing line 34 separates the unit voucher into two portions 35 and 36. Of these, 35 may serve the purpose of a voucher which is retained by the sales clerk to indicate the amount of sales made by him while the second portion 36 may be transmitted to another department of the store to analyze the sale, for example to determine the sales appeal of a certain merchandise or to determine the quantity of merchandise which has been sold and has to be replaced. Preferably, the two tearing lines 33 and 34 are so constructed and arranged that tearing line 33 is considerably weaker than 34 so that when pulling the voucher at the right hand end thereof it will be detached at 33 and not at 34.

It will be noted that the present invention provides a number of important advantages. Thus, first of all a novel and improved posting device is provided which is capable of carrying out a number of bookkeeping functions by means of unit posting of multiple records.

It is also to be observed that the devices and the forms of special character embodying the invention permit to simultaneously make the entries on a plurality of forms in a single posting whereby great efficiency in operation is obtained and transcription errors are positively eliminated.

Moreover, the forms and the devices embodying the invention automatically and positively indicate at all times the writing line wherein the next entry has to be made thereby speeding up operation, rendering improper entries impossible and making it possible to use the forms and the device without any special training or knowledge of bookkeeping.

Furthermore, the device of the invention is extremely simple in character and very inexpensive to make and to use so that it may be employed at a minimum of trouble and expense.

Although the present invention has been described in connection with a preferred embodiment thereof, variations and modifications may be resorted to by those skilled in the art without departing from the principles of the present invention. I consider all of these variations and modifications as within the true spirit and scope of the present invention as disclosed in the foregoing description and defined by the appended claims.

I claim:

1. A posting board comprising in combination a base member, a hinged member having its lower lid connected to one of the marginal portions of said base member, at least two pegs in the lower lid of said hinged member, a removable peg strip bearing a plurality of uniformly spaced pegs inserted between the upper and the lower lids of said hinged member and having holes through which the pegs of said member may protrude to removably hold said peg strip, said peg strip being adapted to receive and to hold a plurality of sheets bearing marginal rows of perforations in predetermined relative position, and a row of elongated openings in the upper lid of said hinged member cooperating with the pegs of said peg strip to fix said sheets in such relative position between said upper and said lower lids, said pegs having such dimensions as to protrude through the upper lid of said hinged member to an extent sufficient to permit collating of additional perforated sheets above the hinged member in the closed position thereof, and the upper lid of said hinged member having a substantially smooth and unobstructed upper surface to provide a smooth supporting surface for the perforated marginal portions of such additional sheets.

2. A posting board comprising in combination a base member, an elongated hinge having its lower lid secured to one of the side edges of said base member, a peg attached to the lower lid of said hinge at each end thereof, a removable peg strip bearing a plurality of uniformly spaced pegs inserted between the upper and the lower lids of said hinge and having holes through which the pegs of said hinge may protrude to removably hold said peg strip, said peg strip being adapted to receive and to hold a plurality of sheets bearing marginal rows of perforations in predetermined relative position, a row of elongated openings in the upper lid of said hinge cooperating with the pegs of said peg strip to fix the marginal portions of said sheets in such relative position between said upper and said lower lids, and holding strips extending from the upper lid of said hinge along the width of said base member for fixing the remaining portions of said sheets, said pegs having such dimensions as to protrude through the upper lid of said hinge to an extent sufficient to permit collating of additional perforated sheets above the hinge in the closed position thereof, and the upper lid of said hinge having a substantially smooth and unobstructed upper surface to provide a smooth supporting surface for the perforated marginal portions of such additional sheets.

3. A posting board comprising in combination a base member, an elongated hinge having its lower lid secured to one of the side edges of said base member, a peg attached to the lower lid of said hinge at each end thereof, a removable peg strip bearing a plurality of uniformly spaced pegs inserted between the upper and the lower lids of said hinge and having holes through which the pegs of said hinge may protrude to removably hold said peg strip, said peg strip being adapted to receive and to hold a plurality of sheets bearing marginal rows of perforations in predetermined collated position, and a row of elongated openings in the upper lid of said hinge cooperating with the pegs of said peg strip to fix the marginal portions of said sheets in such relative position between said upper and said lower lids, said pegs of the peg strip extending beyond the upper lid of said hinge to an extent sufficient to permit collating of additional perforated sheets above the hinge in the closed position thereof, and the upper lid of said hinge having a substantialy smooth and unobstructed upper surface to provide a smooth supporting surface for the perforated marginal portions of such additional sheets.

EDWIN A. GODLEY.